March 21, 1939.　　　W. E. JOHNSON　　　2,151,601
GLOBE
Filed Dec. 21, 1936　　　3 Sheets-Sheet 1

Inventor:
William E. Johnson,
By Dynrenforth, Lee, Chritton & Wiles,
Attys.

March 21, 1939.  W. E. JOHNSON  2,151,601
GLOBE
Filed Dec. 21, 1936  3 Sheets-Sheet 2
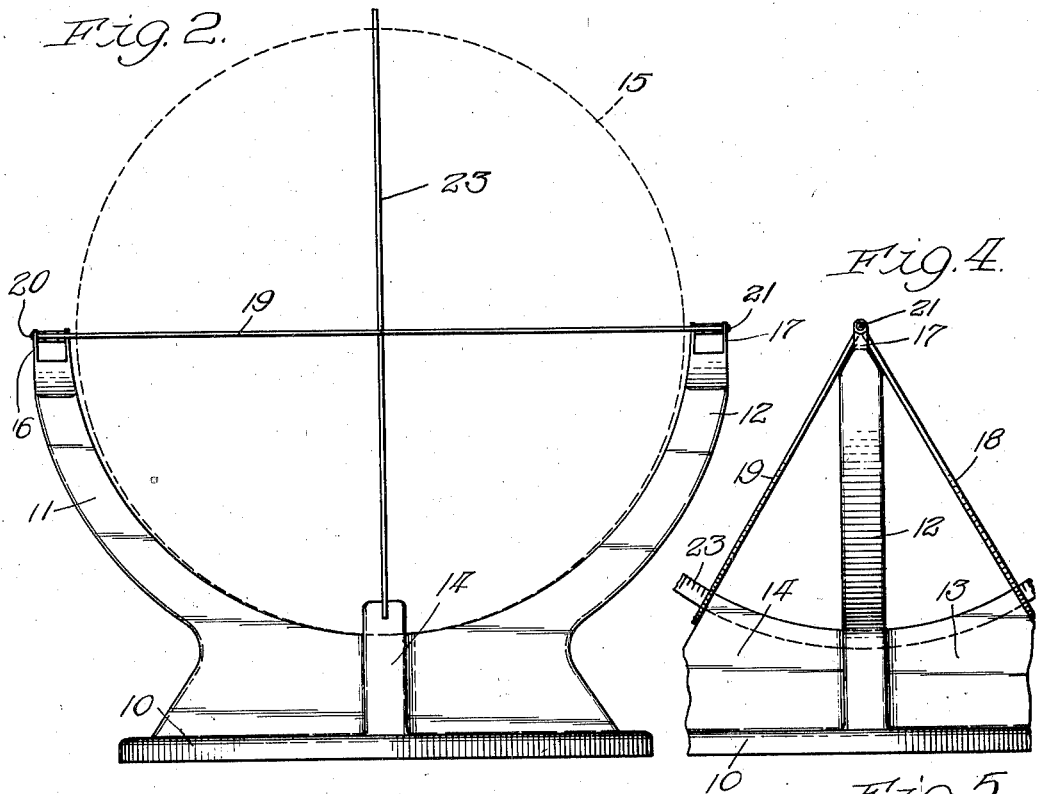
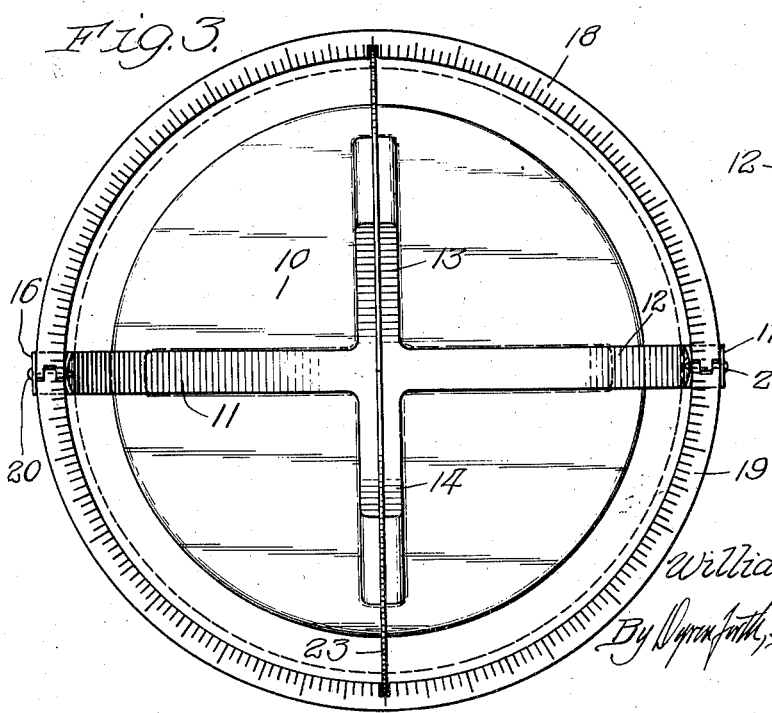
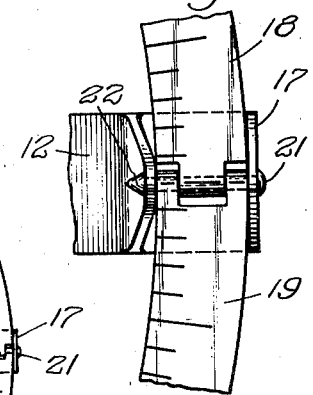
Inventor:
William E Johnson, March 21, 1939.  W. E. JOHNSON  2,151,601
GLOBE
Filed Dec. 21, 1936  3 Sheets-Sheet 3

Inventor:
William E. Johnson,

Patented Mar. 21, 1939

2,151,601

UNITED STATES PATENT OFFICE 2,151,601

GLOBE

William E. Johnson, Chicago, Ill., assignor to Rand McNally & Company, a corporation of Illinois Application December 21, 1936, Serial No. 117,049

8 Claims. (Cl. 35—46)

This invention relates to a globe, and more particularly to a mounting having means thereon for measuring great circle distances.

Figure 1:
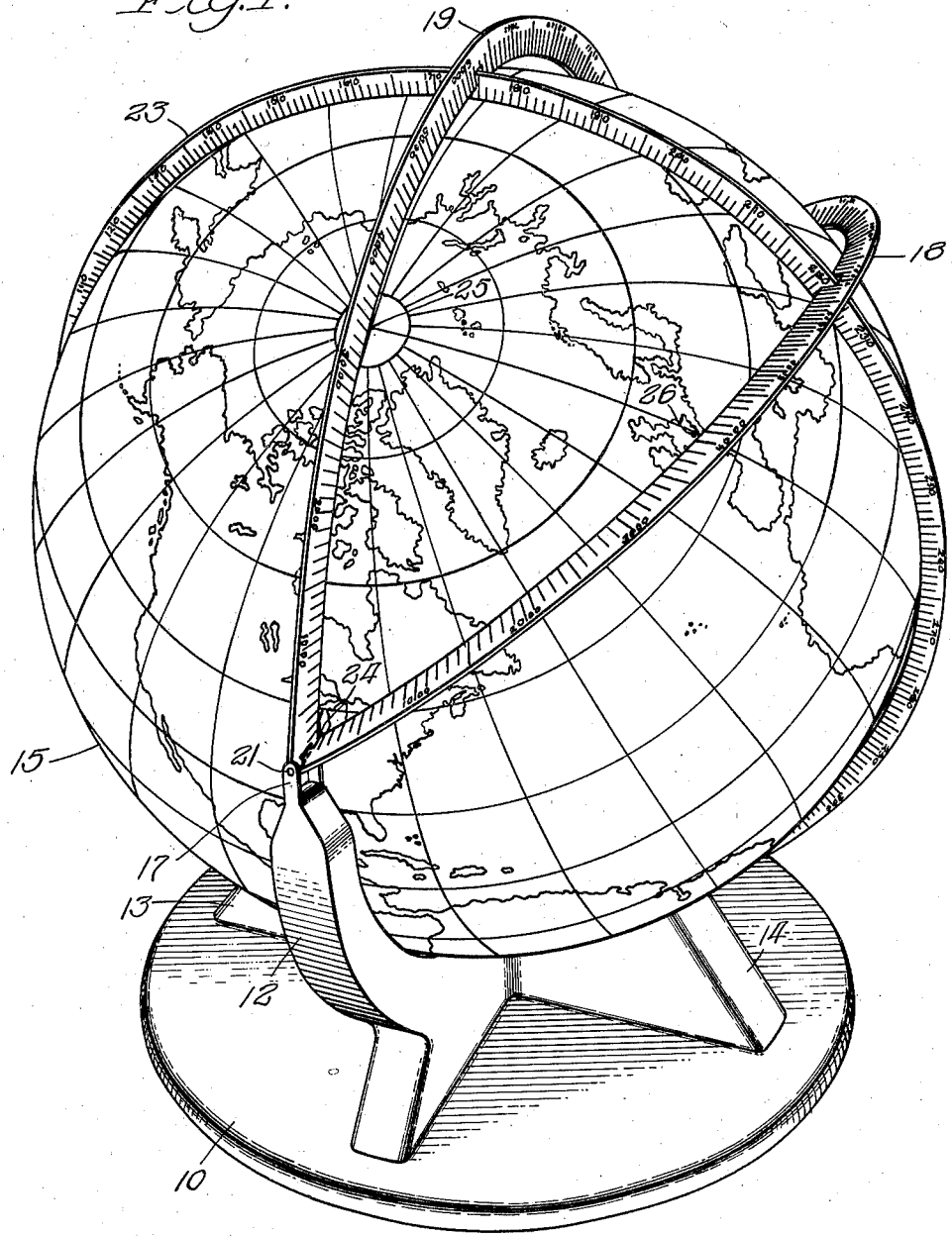
Figure 6:
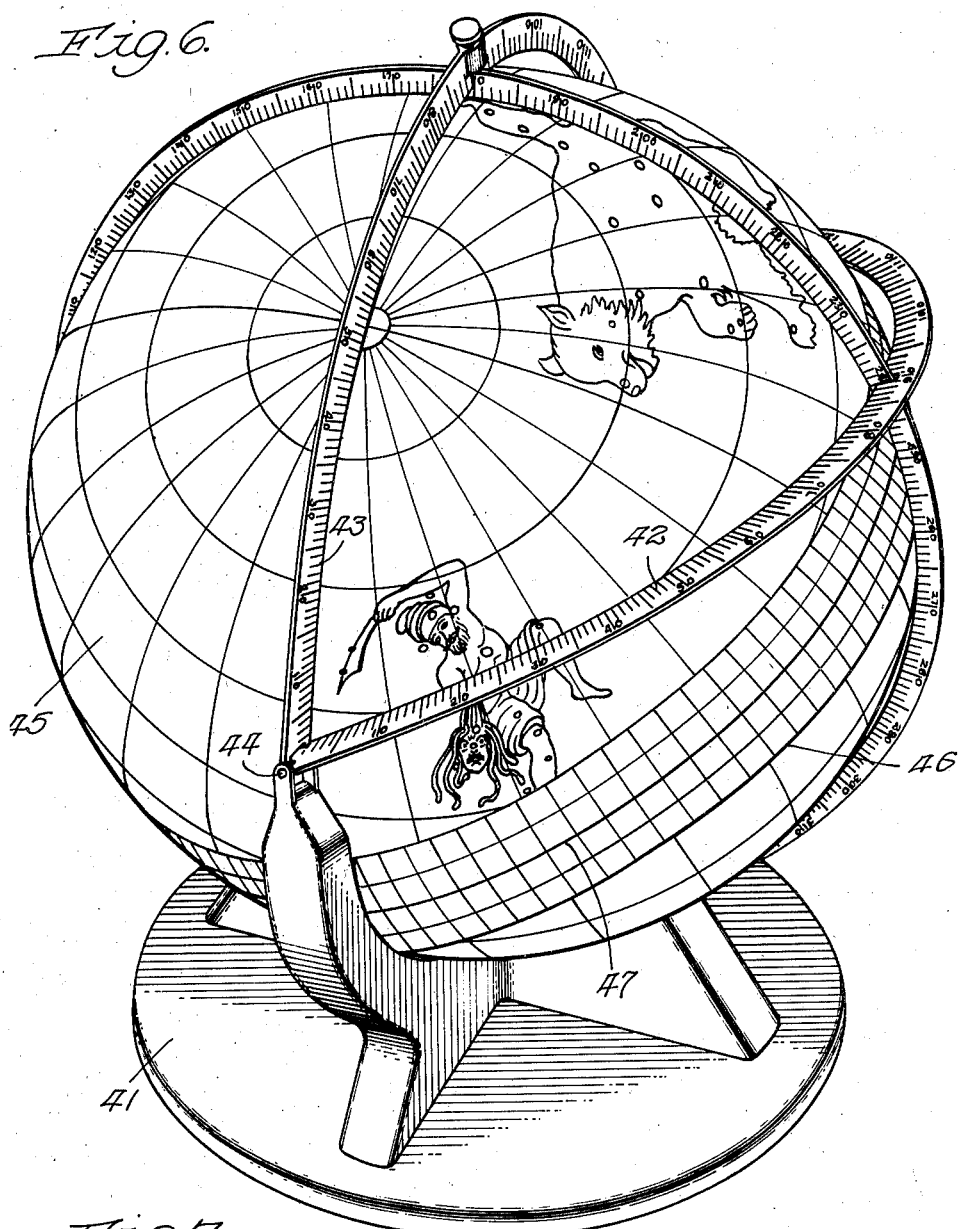
Figure 7:
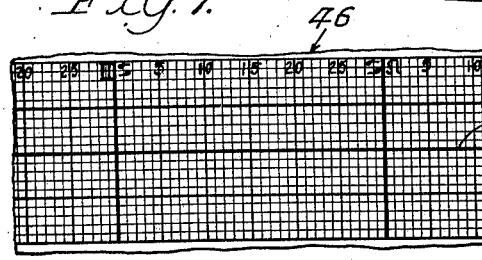

One feature of this invention is that the mounting supports the globe in such a way as to permit universal movement thereof; another feature of this invention is that it permits convenient measurement of the great circle distance between any two points on the surface of the globe; still another feature of this invention is that it permits the true direction of one point with respect to another to be readily found; yet another feature of this invention is that it provides graphical means for locating one's position on the surface of the globe; still another feature of this invention is that it enables ready determination of the signs or divisions of the prime vertical in which planets and stars were at a given time and place; other features and advantages of this invention will be readily apparent from the following specification and the drawings, in which:

Fig. 1 is a perspective view of a terrestrial globe in a preferred form of mounting; Fig. 2 is a side elevation of the mounting shown in Fig. 1; Fig. 3 is a top plan view of the same mounting; Fig. 4 is a fragmentary view showing the scale elements in their lowest position; Fig. 5 is a detailed view of the pivotal mounting for the ends of the scale elements; Fig. 6 is a perspective view showing the mounting in use with a globe having the signs of the zodiac thereon; and Fig. 7 is a detailed view of the zodiacal band on the globe.

It has been customary to mount globes, both terrestrial and celestial, on an axis through the poles, which axis was supported in a rigid mounting or in a meridian ring placed in a stand. The present mounting, however, supports the globe by frictional contact with the surface thereof and permits true universal movement of the globe.

The mounting for the globe is here shown as provided with one or more scale elements which may be either fixed or pivotally attached to the mounting. The mounting has thereon a reference point to which any point on the surface of the globe may be brought, and from which as a point of origin the scale is graduated. The great circle distance between the point adjacent the reference point and any other point on the surface of the globe may then be readily measured by registration the last-mentioned point and the scale. The scale is preferably graduated in linear distances for use with a terrestrial globe and in degrees for use with a celestial globe.

In the particular embodiment of this invention illustrated in Figs. 1-5, the mounting 10 is shown as having arms 11 and 12 extending up about half the diameter of the globe, and forming, with the shorter arms 13 and 14, a cup-shaped socket adapted to receive the globe element, here shown as a terrestrial globe 15. The surface of the globe rests directly on the inner curved surface of these arms, and is prevented from rotation merely by frictional engagement therewith. The mounting is such, however, that the globe may be manually rotated in any direction whatsoever, thus providing a true universal movement.

The arms 11 and 12 are provided at their upper extremities with brackets 16 and 17 having arcuate scale elements, here shown as semi-circles 18 and 19, mounted therein by the pivot-pins 20 and 21. These scale elements are concentric with respect to the globe and so mounted that they are at all points adjacent to the surface of the globe. Inasmuch as the pivot-pins 20 and 21 are at opposed points with respect to the globe, the scale elements 18 and 19 are rotatable about an axis passing through the hinge-pins and the center of the globe. The hinge-pin 21 is here shown as provided with a conical tip or indicator 22 on the inner end thereof closely adjacent the surface of the globe. This tip or indicator serves as a reference point to which any point on the surface of the globe may be brought.

The scales on the two elements 18 and 19 are graduated from the pin 21 as their zero or point of origin. When used with a terrestrial globe the scales preferably read in linear distances, such as miles, kilometers or the like. In addition to the two movable elements the mounting is also provided with a fixed ring 23 in a prime vertical position with respect to the two movable elements. This ring is preferably graduated in degrees of arc, and for convenience the zero point is at the nadir or lowermost point of the globe when it is in the mounting. This is to be distinguished from the usual practice, wherein zero on the scale is at the zenith point of the globe. The prime vertical ring serves to lock the globe in the mounting after assembly, so that although it is freely movable therein it cannot be accidentally displaced therefrom. It also serves as means for frictionally retaining the movable scale elements in any position in which they may be set.

The combination described above is of particular advantage in measuring great circle distances between any two points on the surface of a terrestrial globe, and for getting true directions between said points. Let us assume that it is desired to find the great circle distance between Chicago and London, and the true direction of London from Chicago. Such information may be desired, for example, by a radio amateur. The great circle distance would give him information as to the distance which the waves which he hears on his short wave set traveled from London; and the direction would enable him to better orient his aerial if it were of the directional type, to receive the signals at their maximum intensity.

In order to determine this required information from the globe, it would be rotated manually until the point 24 was adjacent to and coincided with the reference point 22 on the inner end of the pin 21. The movable scale element 19 would then be brought up until it passed over the North Pole point 25 on the globe and the point at which it intersected the prime vertical ring 23 would be noted. For purposes of illustration, let us assume that it intersects the prime vertical ring at the graduation indicating 175°. The other movable scale element 18 would be rotated about its axis through the reference point and the center of the globe until it registered with the point 26 on the surface of the globe, which point represents London. If the scale on the movable element 18 is graduated in statute miles the great circle distance from Chicago to London may be at once read from the scale over the point 26. The point at which the element 18 intersects the prime vertical ring 23 is next noted and found to be 222°. Subtraction of the degree readings from each other gives a difference of 47°, thus showing London to be 47° east of north with respect to Chicago.

If it is desired to find distances and directions of other places from Chicago it is only necessary to move the scale element 18 about its axis until it coincides with such other point, whereupon the scales may be read to again determine linear distance in a great circle course, and direction. As long as it is desired to find the distance and direction of any point east of Chicago, it would be unnecessary to move the ring or scale element 19. If it is desired to find the distance and direction of some point to the west, as in Asia, the element 19 would be dropped until it coincided with such point and the element 18 would be brought up until it passed over the North Pole point. If the desired point lies near the bottom of the globe where the mounting prevents registration of one of the scale elements therewith, it is only necessary to grasp the globe and rotate it about an axis passing through the hinge-pins. This will still leave Chicago adjacent the reference point on the mounting, and will enable the portions of the globe unreachable before to be explored with the scale elements.

It will be noted that the only adjustment of the globe necessary at any time is to bring some particular point on the globe adjacent the reference point 22 on the mounting. It is not necessary to particularly place the pole or the other point at which distance is to be measured, since movement of the two elements 18 and 19 permits registry with these points regardless of their location. If it is desired to use New York as a point of origin it is only necessary to shift the globe until New York on the map is adjacent the reference point 22, whereupon a similar procedure may be followed.

Figs. 6 and 7 show another use of the mounting where it is desired to know the positions of the sun, moon and planets, in conjunction with the stars, with respect to any given time and place. The mounting 41 is again similar to that first discussed, having two movable elements 42 and 43 rotatable about the pin 44. The globe 45 is of a celestial type, but differs from that shown in Fig. 7 in that it is provided with a zodiacal band or belt 46. This band has as the center thereof the ecliptic 47 which is the apparent path of the sun through the stars, and covers an area of about 8 or 9° on each side of the ecliptic. It is shown in more detail in Fig. 9, being ruled with cross-sections. These enable the sun and planets to be spotted in with a pencil or the like as they were at any given time. The information enabling the location may be obtained from the tables in any nautical almanac, for example. The globe is also preferably provided with means for setting it so that the heavens in the upper hemisphere of the globe correspond with those which exist at any given time and place. Such means are not shown in detail here, since they are old in the art and were fully shown and described in my Patent No. 1,853,059, which issued April 12, 1932. It is readily apparent that when the sun, moon and planets have been spotted into the zodiacal band from information secured from appropriate tables and the globe adjusted to a given time and place, the globe represents the heavens exactly as they were or would be at such time and place. Use of the movable elements 42 and 43 enables one to readily determine what sections, divisions of the prime vertical, or portions of the sky were occupied by various stars and planets at that instant.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new and desire to secure by Letters Patent is:

1. A celestial globe of the character described, including: a band printed on and extending around the surface of the globe and having the ecliptic as the center line thereof, said band having an erasable surface extending substantially 9° on each side of said ecliptic and being ruled in cross-section with respect thereto.

2. A support for a globe, including: a mounting for supporting said globe by contact with the surface thereof, said mounting including two opposed arms extending to the middle of said globe; and a ring in said mounting encircling said globe, said ring being in a prime vertical position with respect to said arms and locked in said mounting, whereby universal movement of said globe is facilitated but displacement thereof from said mounting is prevented.

3. A support for a globe, including: a mounting for supporting said globe for universal movement, said mounting having an indicator thereon serving as a reference point, said universal movement facilitating bringing any point on the surface of said globe adjacent said reference point; and an arcuate element having one end thereof pivotally mounted at said reference point, said element being concentric with respect to said globe and the line of pivoting of said element being upon an axis pasing through the center of the globe, whereby great circle determinations may be made between the point on said globe adjacent said reference point and any other point on said globe with which said arcuate element may be moved into registry.

4. Apparatus of the character claimed in claim 3, wherein said arcuate element has thereon a scale originating at said reference point.

5. A support for a globe, including: a mounting for supporting said globe for universal movement, said mounting having an indicator thereon serving as a reference point, said universal movement facilitating bringing any point on the surface of said globe adjacent said reference point; an arcuate element having one end thereof pivotally mounted at said reference point, said element being concentric with respect to said globe and the line of pivoting of said element being upon an axis passing through the center of the globe, whereby great circle determinations may be made between the point on said globe adjacent said reference point and any other point on said globe with which said arcuate element may be moved into registry; and a prime vertical ring, said ring being graduated in degrees.

6. A support for a globe, including: a mounting for supporting said globe for universal movement, said mounting having an indicator thereon serving as a reference point, said universal movement facilitating bringing any point on the surface of said globe adjacent said reference point; an arcuate element having one end thereof pivotally mounted at said reference point, said element being concentric with respect to said globe and the line of pivoting of said element being upon an axis passing through the center of the globe, whereby great circle determinations may be made between the point on said globe adjacent said reference point and any other point on said globe with which said arcuate element may be moved into registry; a prime vertical ring, said ring being graduated in degrees; and a second arcuate element having one end thereof similarly pivotally mounted at the reference point.

7. Apparatus of the character claimed in claim 6, wherein both of said arcuate elements are semi-circular and have scales originating at the reference point.

8. A support for a globe, including: a mounting for supporting said globe for universal movement, said mounting having an indicator thereon serving as a reference point, said universal movement facilitating bringing any point on the surface of said globe adjacent said reference point; an arcuate element having one end thereof pivotally mounted at said reference point, said element being concentric with respect to said globe and the line of pivoting of said element being upon an axis passing through the center of the globe, whereby great circle determinations may be made between the point on said globe adjacent said reference point and any other point on said globe with which said arcuate element may be moved into registry; and a prime vertical ring, both said arcuate element and said ring being thin and said arcuate element being slidably splined on said ring for rotative movement therearound.

WILLIAM E. JOHNSON.